May 3, 1966  YING-CHEN HWANG ETAL  3,249,818
D.C. POWER DISTRIBUTION ARRANGEMENT FOR
HIGH FREQUENCY APPLICATIONS
Filed Feb. 13, 1963
2 Sheets-Sheet 1
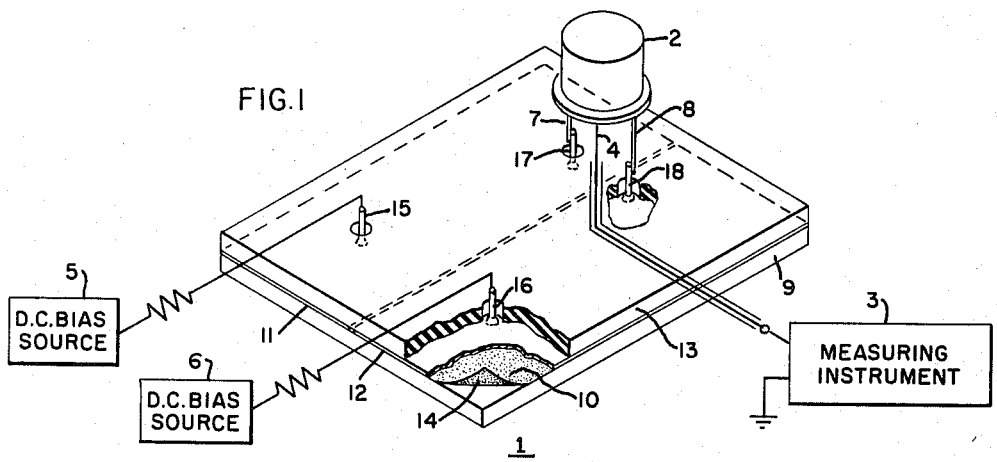
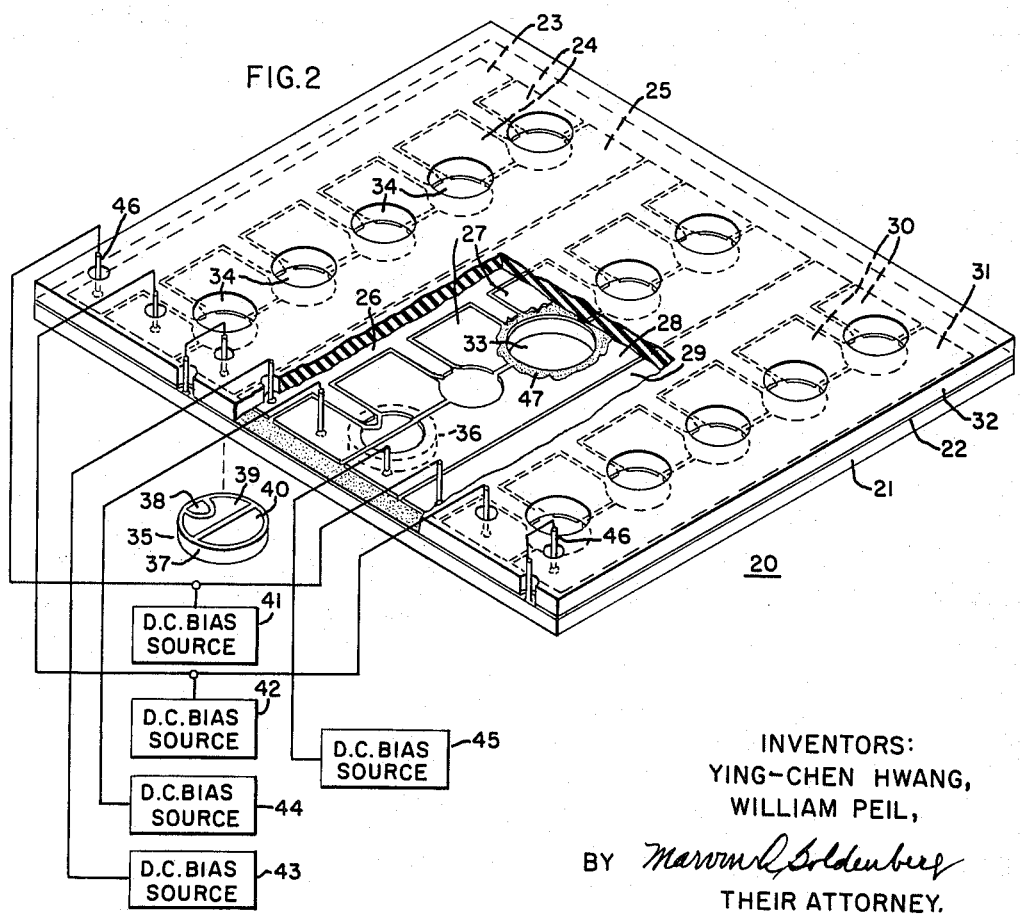
INVENTORS:
YING-CHEN HWANG,
WILLIAM PEIL,
BY *Marvin L. Goldenberg*
THEIR ATTORNEY.

INVENTORS:
YING-CHEN HWANG,
WILLIAM PEIL
BY *Marvin Q. Goldenberg*
THEIR ATTORNEY.

United States Patent Office

3,249,818
Patented May 3, 1966

3,249,818
D.C. POWER DISTRIBUTION ARRANGEMENT FOR HIGH FREQUENCY APPLICATIONS
Ying-Chen Hwang, Liverpool, and William Peil, North Syracuse, N.Y., assignors to General Electric Company, a corporation of New York
Filed Feb. 13, 1963, Ser. No. 258,240
5 Claims. (Cl. 317—101)

The present invention relates to D.C. power distribution arrangements for high frequency applications and has particular utility with high speed logic systems such as embodied in high speed electronic computer equipments. By high speed is meant operation in the very high frequency range and above.

In electrical circuits operating at very high frequencies and above it is normally required to provide an effective bypass to ground of the R.F. energy at points within the D.C. power distribution system. Although bypassing is readily accomplished in lower frequency systems by conventional lumped circuit constants, such as bypassing shunt capacitors, these techniques are not always satisfactory at the higher frequencies and especially where a broadband operation is desired. This is due to stray inductance and capacitance present in association with the lumped circuit constants, the effects of which become significant at the higher frequencies.

In particular, with respect to high speed electronic computers there exists a definite requirement for providing effective A.C. ground points within the D.C. power distribution system. Considerable interest has been generated recently in the field of high speed electronic computers. Although the need for such ultra fast computers has existed for many years, it is more acute today than ever before. The real time computations required for space travel, weather prediction and scientific analysis absolutely demand the existence of these high speed machines. In addition, in areas where present day computer performance is adequate, high speed techniques can be employed to greatly reduce circuit complexity and thus gain the advantages of lower cost and improved reliability.

As alluded to above, a major problem with respect to the satisfactory performance of these high speed machines has been their physical circuit construction, particularly with respect to the D.C. power distribution. A plurality of compatible interconnected logical elements are normally employed in such machines, the same as are employed in the more conventional lower frequency computer circuits, which elements are energized by a limited number of D.C. sources along common distribution means. The operation of the logical elements is extremely sensitive to both amplitude and phase of the applied A.C. Accordingly, any appreciable R.F. signal cross-coupling among the logical elements along the D.C. distribution means tends to introduce errors into the system and cannot be tolerated. Whereas in the more conventional equipments cross-coupling along the D.C. distribution means is readily eliminated by conventional lumped circuit constants, in the very high and ultra high frequency systems of the type under consideration such lumped circuit techniques are not feasible due to stray inductance and capacitance. In addition, the impedance of the components as normally employed in these systems is very low, making the bypassing requirements the more difficult.

It is therefore an object of the present invention to provide a novel D.C. power distribution arrangement for use in electrical circuits operating in the very high frequency range and above, within which an effective A.C. ground at the R.F. frequencies is established.

It is a further object of the present invention to provide a novel D.C. power distribution arrangement for use in electrical circuits operating broadband in the very high frequency range and above, within which an effective A.C. ground at the R.F. frequencies is established.

It is another object of the present invention to provide a novel D.C. power distribution arrangement for use with high speed logic systems which efficiently transmit D.C. power from a single energy source to a plurality of logical elements and which effectively eliminates undesirable cross-coupling among said logical elements of the R.F. signal pulses generated therein.

It is yet another object of the present invention to provide a novel construction of a D.C. power distribution arrangement for use in high speed logic systems having the above noted characteristics and which can be readily and inexpensively fabricated.

Briefly, these and other objects of the invention are accomplished in an electrical circuit operating in the very high frequency range and above having one or more terminals adapted to be energized by a D.C. energy source or sources and which terminals are required to be at A.C. ground potential. A form of strip distribution lines are employed between said D.C. sources and said terminals, the distribution lines, in addition to providing a low series impedance for the D.C. energy, are characterized by a low characteristic impedance for the R.F. energy and a low Q. In addition, the distribution lines are constructed so as to be non-resonant at all frequencies where appreciable energy is present. However, because of their low Q even at the resonant frequency the input impedance is extremely low, e.g., less than one ohm. Accordingly, the lines provide an effective A.C. ground potential.

More particularly, the distribution lines comprise a sandwich construction of a metal ground plate, a thin layer of dielectric and relatively wide metal conductor strips. The low characteristic impedance and the low Q for the lines is provided principally by the geometrical configuration of the sandwich construction, namely extremely narrow spacing between conductors and large opposing surface areas of the conductors, and low conductor spacing to surface resistivity ratio. In addition, the surface of the dielectric is coated with a relatively poor conductor material so as to increase the series resistance seen by the R.F. and further reduce the Q. The fabrication is well suited for printed circuit techniques.

In accordance with one specific aspect of the invention the above described D.C. power distribution construction is employed in a high speed logic system having a plurality of logical elements including groups of terminals, each group adapted to be energized by a given D.C. potential. The terminals must be effectively connected to A.C. ground to avoid cross-coupling among said elements. For each D.C. power source there is provided a metal conductor strip coated onto an insulating backing plate which may be insulated from corresponding D.C. conducting metal strips coated onto the same backing plate by an etched barrier. A single metal ground plate is provided common to all conductor strips. Apertures may be provided in the ground plate and conductor strip plate for ready insertion of the logical elements fabricated in module form.

The characteristics of the invention which are believed to be novel are set forth with particularity in the appended claims. The invention itself, however, both as to its organization and method of operation, together with further objects and advantages thereof may best be understood from the following description when taken in connection with the drawings, wherein:

FIGURE 1 is a perspective view of a pair of strip D.C. power distribution lines, constructed in accordance with the invention employed in the measurement of various parameters of an active element;

FIGURE 2 is a perspective view of a strip line assembly incorporating the principles of the present invention for distributing D.C. power in a high speed logic system;

Figure 3:
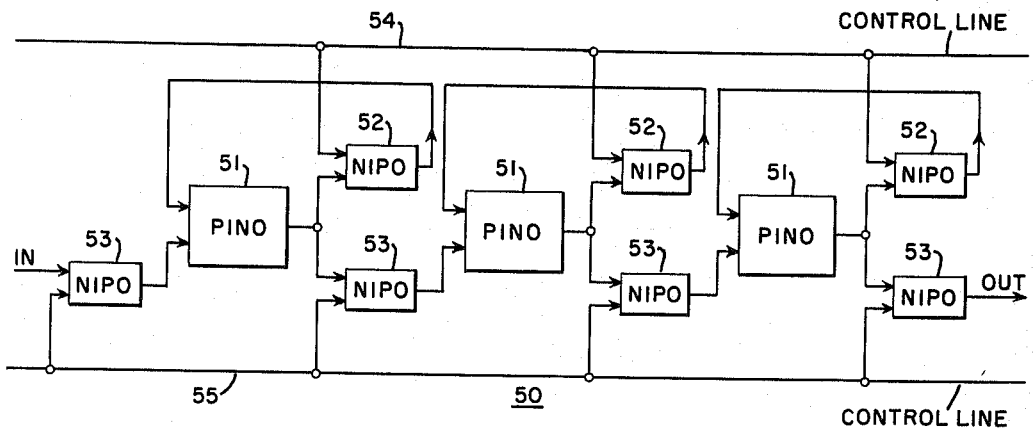
FIGURE 3 is a block diagram of a shift register such as many be constructed in accordance with the assembly shown in FIGURE 2.

Referring to FIGURE 1, there is illustrated a measurement rig employing a D.C. power distribution arrangement 1 in accordance with principles of the invention for supplying the bias voltages to a transistor 2 designed to operate in the very high frequency range. A measuring instrument 3, for example, a Wayne-Kerr Bridge, is connected through a coax cable to lead 4 of one electrode of the transistor over a wide range of R.F. frequencies for measuring various parameters of the transistor, such as the $h$, $y$ and $z$ parameters, i.e., the hybrid, short circuit admittance and open circuit impedance parameters, respectively. For accurate measurements it is necessary to provide and A.C. ground potential at one or both of the remaining electrodes, depending on which measurement is taken.

By way of example, measurement of the $h_{ie}$ parameter will be considered. Thus, the lead 4 is the base electrode lead. D.C. bias voltages are supplied by voltage sources 5 and 6 to the collector electrode lead 7 and the emitter electrode lead 8, respectively, both of which for this measurement must be at A.C. ground. By means of the D.C. power distribution arrangement illustrated this constraint is effectively met. A conductive ground plate 9, such as a copper plate, has overlaid thereon a thin sheet dielectric layer 10 which is, for example, Mylar. Overlying the dielectric layer 10 are a pair of conductive strips 11 and 12, which may also be copper plates, mounted on an insulating backing board 13 and electrically insulated from one another. The ratio of the thickness of the dielectric layer 10 to the width of the copper strips is very low, e.g., on the order of .01 or less, and typically about .001. Thus, the dielectric constant property of the dielectric layer 10 in combination with the geometrical configuration of the strip distribution lines provides a high distributed capacitance, a low characteristic impedance and a low Q characteristic. In addition, the dielectric layer 10 may have applied to one or both surfaces a thin coating of material 14 of relatively poor conductive properties. The material 14 may be an inhomogeneous mixture of conductor granules with a binder, such as a coating of silver paint. This coating increases the shunt capacitance of the strip lines by obviating the effect of any gaps that may exist between the metal plates and the dielectric layer because of imperfect contact. The coating also provides, effectively, a relatively high series resistance to R.F. energy but does not alter the high conductive characteristics of the copper plates 9, 11 and 12. It thus further reduces the Q characteristic of the distribution lines and provides a low impedance, e.g., less than one ohm, even at the resonant frequencies, the figure for the Q being on the order of 10 or less.

The voltage source 5, which for a PNP transistor may be about 4.5 volts, is coupled to terminal pin 15 which is in electrical contact with conductive strip 11. The voltage source 6, having a voltage of about 2.6 volts, is coupled to terminal pin 16 in electrical contact with conductive strip 12. Terminal pin 17, in electrical contact with strip 11, couples the voltage from strip 11 to the collector electrode lead 7 of transistor 2, and terminal pin 18, in electrical contact with strip 12, couples the voltage from strip 12 to the emitter electrode lead 8. Any R.F. energy appearing at electrodes 7 and 8 due to the signals applied from the measuring instrument 3 will be effectively shorted to ground at terminals 17 and 18.

In FIGURE 2 there is shown in perspective view a D.C. power distribution assembly 20 which is applicable for use with a high speed logic system having a plurality of logical elements. The assembly 20 provides a form of strip line distribution paths for coupling a plurality of D.C. bias voltages to the active components of said logical elements. Similar to FIGURE 1, the distribution paths are constructed so as to be characterized by a low series impedance path for D.C. energy, a low characteristic impedance and low Q for the R.F. frequencies at which the logical elements are operated.

The D.C. power distribution assembly includes a metal ground plate 21, which may be copper, overlaid by a thin sheet dielectric layer 22, typically Mylar. Overlaying the dielectric layer 22 are strips 23, 24, 25, 26, 27, 28, 29, 30 and 31 of conductive material, such as copper, which together with the ground plate 21 and dielectric layer 22 form the strip distribution paths. The conductive metal strips 23 to 31 may be conveniently applied using printed circuit techniques to an insulator backing board 32 so that the strips are insulated from each other by etching away lines of the metal. As with respect to the construction illustrated in FIGURE 1, the ratio of the thickness of the dielectric layer 22 to the average width of each conductive strip is extremely small, so that the geometrical configuration of the strip line paths provide a low Q characteristic. In addition, the dielectric layer 22 may have coated on one or both surfaces thereof a relatively poor conducting material 47 such as a silver paint for further reducing the Q.

The ground plate 21, dielectric layer 22 and conductive strips 23 to 31 are seen to have a series of concentrically disposed apertures 33 and 34 which accommodate the logical elements of the system. Apertures 33 which are contained in the ground plate 21 and dielectric layer 22 are of somewhat larger diameter than apertures 34 contained in the conductive strips and backing board 32 to provide for the mounting of the logical elements. The logical elements are typically in module form, two such modules 35 and 36 being illustrated. Module 35 is shown pulled away from the assembly and module 36 inserted. The modules may be readily constructed by depositing a conductive metal, such as copper, onto an insulating backing 37. The metal is deposited so as to form a plurality of D.C. zones adapted to have applied thereto different D.C. potentials. In the modules under consideration three D.C. zones 38, 39 and 40 are provided for each module. With the modules inserted in the board assembly 20, such as illustrated with respect to module 36, the three D.C. zones are in electrical contact with three corresponding conductive strips of the plurality of strips 23 to 31. Thus, the zones 38, 39 and 40 of module 36 are connected, respectively to conductive strips 26, 27 and 28. In the construction shown, the modules are of slightly smaller dimension than the apertures 33 and are inserted therein and mechanically fastened to the conductive strips so that the surfaces at the outer regions of zones 38 to 40 contact the associated conductive strips 26 to 28. It may be seen that the zone 39 also provides coupling for the segments of the conductive strip 27 at each of the module positions so as to provide a continuous path.

Each of the modules may be provided with terminal pins to which are connected the active and passive components of the logical elements, not shown. The terminal pins may be electrically connected and fastened to the D.C. zones or to tiny islands provided within the zones which are insulated therefrom and are at a floating potential. In the modules under consideration, a single transistor and single tunnel diode form the active elements with a plurality of resistors at the input connections forming the passing elements. Two different types of logical elements are required in the exemplary logic system being considered, one termed a Pino and the other a Nipo which differ from one another only in that the active elements are inverted. The schematic diagrams for these elements are shown in FIGURES 4A and 4B and will be considered in greater detail presently.

Figure 4A:
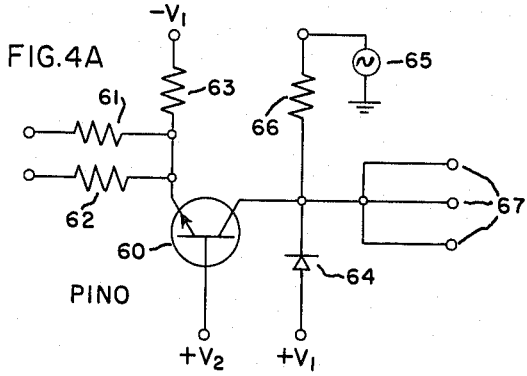
FIGURE 4A is a schematic diagram of a typical logical element or module of a first type employed in the block diagram of FIGURE 3.
Figure 4B:
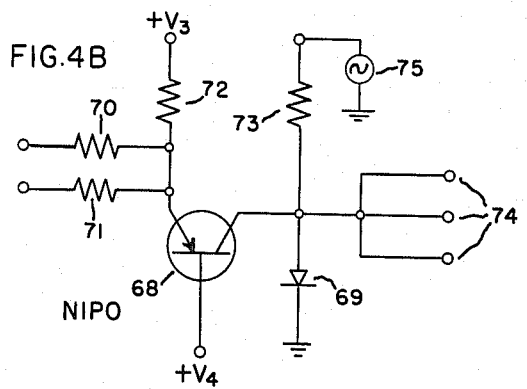
FIGURE 4B is a schematic diagram of a typical module of a second type employed in the block diagram of FIGURE 3.

It may be noted from FIGURES 4A and 4B that the Pino and Nipo elements require different D.C. bias voltages for their operation, a set of three D.C. voltages for the Pino and a different set of three voltages for the Nipo elements. Accordingly, five different D.C. voltage sources are provided, 41, 42, 43, 44 and 45, with the sixth voltage being ground. The conductive strips 23 to 31 are provided with terminal pins 46 to which said D.C. source voltages are connected. Source 41 is connected to strips 23 and 29; source 42 is connected to strips 24 and 30; source 43 is connected to strip 26; source 44 is connected to strip 27, source 45 is connected to strip 28; and strips 25 and 31 are connected to ground plate 21. Thus, in this embodiment all modules connected to strips 23 to 25 and 29 to 31 are of one type and all modules connected to strips 26 to 28 of a second type. For a shift register of the type shown in FIGURE 3, the modules of one type are Nipo elements and the modules of the second type are Pino elements.

The board assembly 20 may be employed for providing the D.C. energy in various types of logic systems performing various logic functions. With the modules inserted in the apertures provided and interconnected in a desired fashion a multitude of logical functions can be accomplished. One exemplary logical function, that of a shift register, is illustrated in FIGURE 3. It is noted, however, that the form of construction illustrated in FIGURE 2 is not limited to the specific logic function shown in FIGURE 3 nor to the specific module circuitry employed therein. Accordingly, other and different high speed logical elements than those specifically described can be employed in an assembly such as is illustrated in FIGURE 2. It is further noted that although the modules specifically referred to each require three different D.C. bias voltages, requiring three conductive strips connected to each module, the number of conductive strips required is entirely a function of the number of D.C. voltages required per module and may be therefore a lesser or greater number than three.

Because of the impedance characteristics provided by the D.C. distribution paths, the D.C. zones 38 to 40 of each of the modules establishes an effective A.C. ground potential which preclude the cross-coupling of R.F. energy among the logical elements.

Referring now to FIGURE 3, there is illustrated a block diagram of a shift register 50, of which three stages are shown, which may be readily fabricated in a manner such as illustrated in FIGURE 2. Each stage includes three logical elements, one Pino element 51 and first and second Nipo elements 52 and 53, the schematic circuitry of the Pino and Nipo elements being indicated in FIGURES 4A and 4B, respectively. The term "Pino" signifies positive input and negative output, and the term "Nipo" signifies negative input and positive output. These basic elements and their application in logical systems have been described in an article entitled, "Analysis of a Pumped Tunnel Diode Logic Circuit," by Y.-C. Hwang et al., appearing in the IRE Transactions of Professional Group on Circuit Theory, vol. CT 9, No. 3, September 1962 and in a copending application entitled "Tunnel Diode Logic Circuit," Serial No. 80,621, filed January 4, 1961, which matured into U.S. Patent No. 3,163,775, December 29, 1964 and assigned to the assignee of the present invention.

In each stage of the shift register 50 the output from the Pino element 51 is coupled to each of the Nipo elements 52 and 53 as a first input thereto. A reset signal from control line 54 is connected as a second input to the first or memory Nipo element 52. A transfer signal is connected from a second control line 55 as a second input to the second or transfer Nipo element 53. The output from the transfer Nipo element 53 in each stage is connected as a first input to the Pino element 51 of the succeeding stage. The output from the memory Nipo element 52 is fed back as a second input to the Pino element 51 of the same stage. Each of the Pino and Nipo elements provide a delay of one quarter wavelength of the generated pulses traversing said elements. In addition, each of the leads interconnecting said Pino and Nipo elements also provide a delay of one quarter wavelength. A pump signal is applied to each of the Pino and Nipo elements from a pump source, not shown in FIGURE 3, for generating an output pulse. The pump signal may be advantageously applied in a manner taught in a copending application entitled, "Clock Power Distribution Arrangement for High Speed Logic Systems," Serial No. 258,295, filed February 13, 1963, and assigned to the present assignee. The frequency of the pump signal determines the frequency of operation of the system. The described inputs applied to each of the elements act to selectively gate the pump signal through the elements by inhibiting the generation of an output by the pump or permitting such output generation. Thus, if the application of the pump signal is considered to provide a "1" output, the input signals will be either a "0" or a "1" for selectively passing or inhibiting said pump signal.

In the operation of the device illustrated in FIGURE 3, a hold condition in each stage may be accomplished by simultaneously applying a "0" reset pulse from control line 54 to elements 52 and a "1" transfer pulse from control line 55 to elements 53. For this condition whatever information is stored in each stage will circulate through the Pino element 51 and the memory Nipo element 52. In addition, the information will not be shifted to succeeding stages and the transfer Nipo elements 53 will have a "0" output. A shift operation is accomplished by simultaneously applying a "1" reset pulse and a "0" transfer pulse to Nipo elements 52 and 53, respectively. Information in each stage will now be shifted through the transfer Nipo element 53 to the Pino element of the succeeding stage. In addition, the output of the memory Nipo elements will be a "0" so that each stage is made ready to receive new information.

In FIGURES 4A and 4B are schematically shown a Pino and Nipo element, respectively, of the type employed in the blocks of FIGURE 3. The Pino element of FIGURE 4A includes an NPN transistor 60 to the emitter of which may be coupled a pair of inputs through resistors 61 and 62. A bias voltage source $-V_1$ of about $-3$ volts is coupled through resistor 63 to said emitter. The base is connected to a voltage source $+V_2$ of about .9 volt and the collector through a tunnel diode 64 to a voltage source $+V_1$ of about 3 volts. A pump source 65 is connected through a resistor 66 to the junction of the collector electrode and tunnel diode cathode from which a plurality of outputs 67 may be taken. The pump is operated at the frequency of the logic system, for example, 200 mc., and produces a negative going output pulse for every negative half cycle of the pump signal unless inhibited by a positive going input applied to the transistor.

The Nipo element of FIGURE 4B is similar to the Pino element except that a PNP transistor 68 is employed and the tunnel diode 69 is poled in the reverse direction from the diode 64. Input resistors 70, 71 and bias resistors 72, 73 correspond to resistors 61, 62 and 63, 66, respectively, of the Pino element. D.C. bias voltage sources $+V_3$, $+V_4$ of about 4.5 volts and 2.6 volts are applied to the emitter and base electrodes, respectively, of the transistor 66. The cathode of tunnel diode 69 is grounded. The tunnel diode is triggered to provide a positive going output pulse at output 74 every positive half cycle of the pump signal from pump source 75 unless inhibited by the negative going input applied to the transistor.

A more detailed description of the operation of these elements is provided in the aforementioned copending application Serial No. 80,621.

Although the invention has been described with respect to specific exemplary embodiments for the purpose of clear disclosure, it is recognized that numerous modifications may occur to those skilled in the art. The appended claims are intended to cover all modifications falling within the true scope and spirit of the invention.

What we claim as new and desire to secure by Letters Patent of the United States is:

1. A D.C. power distribution system for supplying D.C. power to a plurality of high frequency circuit components in modular form and which establishes an effective A.C. ground for the modules, said system including at least a single D.C. path comprising:
    (a) a conductive plane,
    (b) a thin dielectric layer overlaying said conductive plane,
    (c) said conductive plane and dielectric layer having a first series of superposed apertures of given dimension disposed therein which are adapted for insertion of said modules,
    (d) a conductive strip overlaying said dielectric layer, the ratio of the spacing between said conductive plane and said conductive strip and the average width of said strip being low, said path thereby being characterized by a low characteristic impedance and low Q for high frequency energy,
    (e) said conductive strip having a second series of apertures corresponding to said first series and of smaller dimension than said given dimension so as to provide exposed surfaces on said conductive strip for making electrical contact with said modules upon insertion thereof.

2. A D.C. power distribution system as in claim 1 wherein said ratio is on the order of less than .01.

3. A D.C. power distribution system as in claim 2 wherein said dielectric layer is coated with a poor conducting material for further reducing the Q and the characteristic impedance of the path.

4. A D.C. power distribution system for supplying D.C. power to a plurality of high frequency circuit components in modular form and which establishes an effective A.C. ground for the modules, said system including a plurality of D.C. paths comprising:
    (a) a metal ground plate of extended area,
    (b) a thin dielectric layer overlaying said ground plate,
    (c) said ground plate and dielectric layer having a first series of superposed apertures of given dimension disposed therein which are adapted for insertion of said modules,
    (d) a plurality of metal strips electrically insulated from each other overlaying said dielectric layer, the ratio of the spacing between said ground plate and said strips and the average width of said strips being less than .01, said paths thereby being characterized by a low characteristic impedance and low Q for high frequency energy,
    (e) said metal strips having a second series of apertures concentrically arranged with respect to said first series and of smaller dimension than said given dimension so as to provide exposed surfaces on said metal strips for making electrical contact with corresponding conductive surfaces of said modules upon insertion thereof.

5. A D.C. power distribution system as in claim 4 wherein said dielectric layer is coated with a poor conducting material for further reducing the Q and the characteristic impedance of the paths.

References Cited by the Examiner
UNITED STATES PATENTS

| | | | |
|---|---|---|---|
| 2,877,427 | 3/1959 | Butler | 333—9 |
| 2,938,175 | 5/1960 | Sommers | 333—84 |
| 2,943,956 | 7/1960 | Robinson | 174—68.5 |
| 3,155,881 | 11/1964 | St. Jean | 317—101 |
| 3,179,904 | 4/1965 | Paulsen | 333—1 |
| 3,189,847 | 6/1965 | Rymaszewski | 333—1 |

OTHER REFERENCES

Rymaszewski et al.: IBM Technical Disclosure Bulletin, vol. 5, No. 2, July 1962, p. 29.

HERMAN KARL SAALBACH, *Primary Examiner.*

C. BARAFF, *Assistant Examiner.*